United States Patent [19]
Wakefield

[11] 4,353,450
[45] Oct. 12, 1982

[54] TWO STAGE DISENGAGEMENT SPRING FOR ELECTROMAGNETIC TOOTH CLUTCHES

[76] Inventor: Jack C. Wakefield, 2779 Miller St., Big Flats, N.Y. 14814

[21] Appl. No.: 104,350

[22] Filed: Dec. 17, 1979
(Under 37 CFR 1.47)

[51] Int. Cl.$^3$ .............................................. F16D 27/10
[52] U.S. Cl. ................................ 192/84 C; 192/89 B
[58] Field of Search .............. 192/84 C, 84 B, 84 A, 192/84 AA, 89 B, 70.28; 188/72.3, 161, 163, 216

[56] References Cited
U.S. PATENT DOCUMENTS

| | | | |
|---|---|---|---|
| 4,010,832 | 3/1977 | Puro | 192/84 C |
| 4,232,772 | 11/1980 | Brissey et al. | 192/84 C |

FOREIGN PATENT DOCUMENTS 961772  6/1964  United Kingdom .............. 192/84 C

*Primary Examiner*—Rodney H. Bonck
*Attorney, Agent, or Firm*—Remy J. VanOphem

[57] ABSTRACT

An electromagnetic clutch has a toothed driving clutch member and a toothed driven clutch member which are moved together upon energization of an electromagnet with their teeth in engagement. A spring disengages the teeth when the electromagnet is deenergized. The spring provides a relatively large spring force for initial breakaway to overcome residual magnetism and metal to metal contact of the teeth. After initial breakaway, the spring provides only sufficient force to further separate the members. With this arrangement, a small magnet may be used to engage the clutch because the large force of the spring must be overcome only during final engagement of the clutch.

9 Claims, 4 Drawing Figures

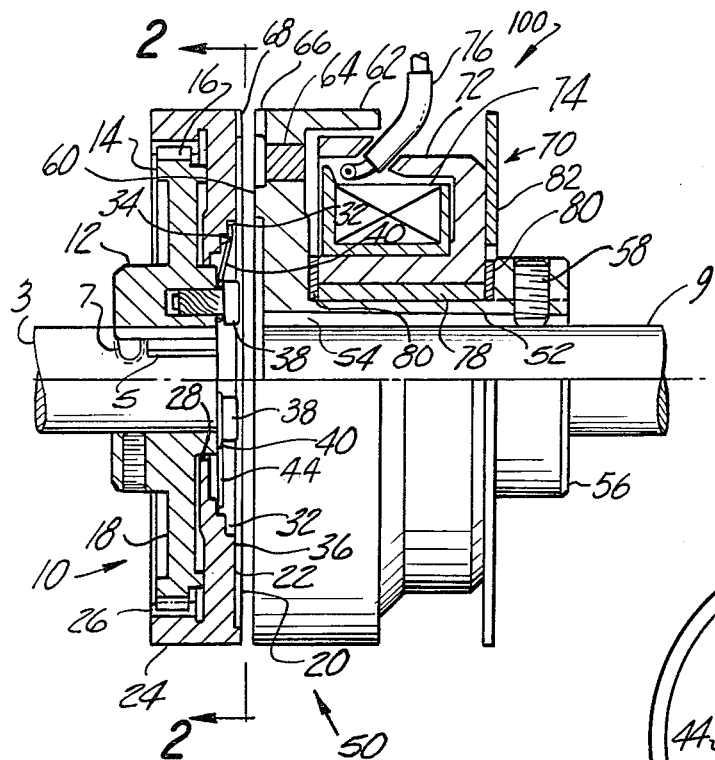
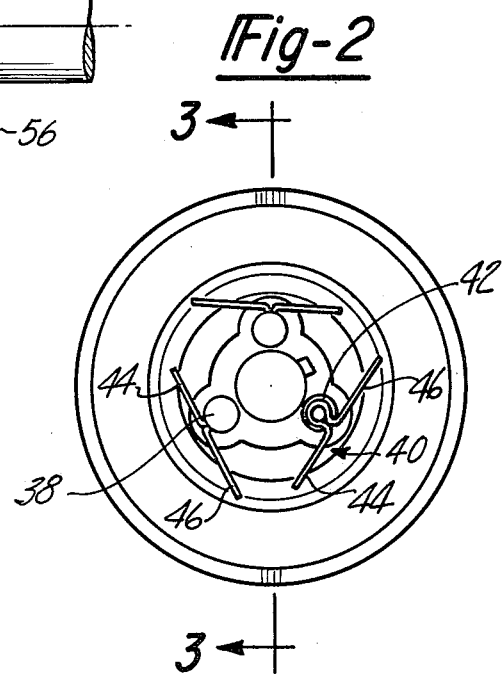
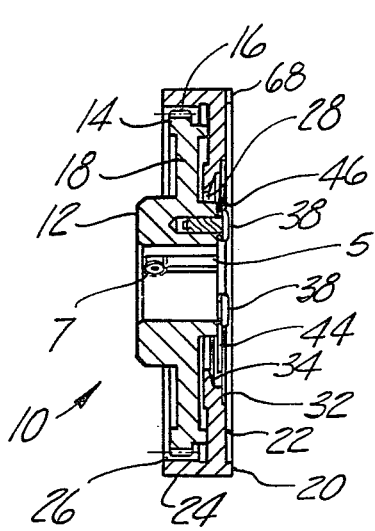
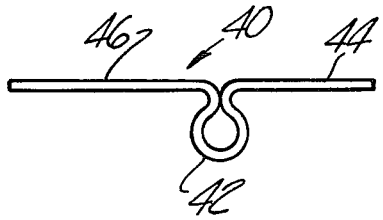

TWO STAGE DISENGAGEMENT SPRING FOR ELECTROMAGNETIC TOOTH CLUTCHES

BACKGROUND OF THE INVENTION

1. Field of the Invention

The invention relates to electrically operated friction devices and more particularly to electromagnetic clutches.

2. Description of the Prior Art

Electromagnetic clutches as used heretofore have a toothed driving clutch member and a toothed driven clutch member which are moved together upon energization of an electromagnet for engagement of their teeth. A spring disengages the teeth when the electromagnet is deenergized. However, residual magnetism in the driving and driven clutch members tends to impede the separation of the clutch members and a heavy spring is required for initial breakway from the metal to metal contact of the teeth. The same heavy spring is used to further move the clutch members a sufficient distance to separate the teeth and permit relative rotation of the clutch members. When it is desired to engage the clutches, the electromagnet is energized. The magnetic force thus produced must not only overcome the losses associated with maintaining the field across an air gap but also the heavy spring force during the entire movement of the clutch members to engage the teeth. This requires a larger electromagnet in order to compensate for the increase in electromagnetic force required to engage the clutch members.

In U.S. Pat. No. 4,010,832, a two stage spring force was devised in order to reduce the electromagnetic force required to engage the clutch members. In this device, a washer spring was formed with a stiff finger with a relatively small offset for initially separating the clutch members. In addition, the spring was also formed with a light finger with a relatively large offset for further separating the clutch members until the teeth are completely disengaged. Thus, the magnetic force required to engage the clutch members was reduced.

This device has been found to have significant drawbacks. The tooling required to form the spring with its two different offsets and fingers was very expensive. In addition, it has been found difficult to fabricate the spring offsets within the production tolerances required.

SUMMARY OF THE INVENTION

The present invention relates to an electromagnetic clutch which includes a novel disengaging spring for separating the clutch members from one another. The disengaging spring exerts a large spring force for initial breakaway sufficient to overcome residual magnetism and metal to metal contact and a small spring force to further separate the clutch members after initial breakaway. The spring is centrally fastened to one clutch member such that one spring length operates against one radial offset on the armature face while another spring length operates against another radial offset on the armature face. The spring may be made from a steel wire or other spring material and is inexpensive to manufacture. With this arrangement, a small magnet may be used because the larger force of the spring must be overcome only during final engagement of the clutch members when the air gap in the magnetic circuit is small.

The invention contemplates an electromagnetic clutch having a driving clutch member and a driven clutch member; an armature on one of said members and an electromagnet having a pair of poles on the other of said members for providing a driving engagement between the members when the electromagnet is energized, and a two stage spring means for providing a force sufficient to disengage the armature from the pole faces when the electromagnet is deenergized to overcome the residual magnetism and for providing a smaller force sufficient to further separate the armature from the poles to permit relative rotation of the clutch members.

It is an object of the present invention to provide a novel two stage disengagement spring for electromagnetic tooth clutches that is simple to assemble and economical in construction and eliminates the need to maintain very close tolerances on washer type springs using spring finger offsets.

It is a further object of the invention to provide a two stage disengagement spring which is centrally fastened so that one spring length operates against one radial offset formed on the armature face and the other spring length operates on another radial offset formed on the armature face.

BRIEF DESCRIPTION OF THE DRAWINGS

FIG. 1 is a side view partly in section of an electromagnetic clutch constructed according to the invention.

FIG. 2 is a transverse view taken approximately on the line 2—2 of FIG. 1.

FIG. 3 is a sectional view of FIG. 2 taken on the line 3—3.

FIG. 4 is a detail view of the spring.

DETAILED DESCRIPTION OF THE INVENTION

Referring to FIGS. 1 and 2, the electromagnetic clutch generally designated by the numeral 100 comprises an armature assembly 10 keyed to a driving shaft 3 and a magnetic coil assembly 50 keyed to a driven shaft 9. The armature assembly 10 includes a hub 12 secured to the driving shaft 3 by a key 5 and a set screw 7. A rim 14 with a circumferential spline 16 is attached to the hub 12 by a disk portion 18. An armature member 20 has a radial portion 22 which terminates in a circumferential flange 24. The flange 24 has a spline 26 on the inner diameter for cooperating with the spline 16 on the rim 14. The armature 20 also has an axial aperture 28 therein for receiving the hub 12. The splines 16, 26 cooperate for drivably connecting the hub 12 to the armature 20 and for permitting relative axial movement of the armature on the hub. The armature 20 further has a first diametrical indentation 32 and a second diametrical indentation 34 on the face 36 of the radial portion 22 facing the magnetic coil assembly 50. The first indentation 32 is larger in diameter than the second indentation 34.

As shown in FIGS. 2 and 4, the novel spring 40 constructed according to the invention for moving the armature member 20 axially on the hub 12 to disengage the clutch has a loop 42. The spring 40 is secured to the hub 12 by any convenient means such as a screw 38 which is positioned through the loop 42. The spring 40 has at least two fingers 44 and 46 integral with the loop 42 for engaging the armature member 20. As best seen in FIG. 3, one finger 44 engages the second indentation 34 in the armature face while the second finger 46 engages the first identation 32 in the armature face. The spring is attached to the hub 12 and cooperates with the armature member 20 so that the spring avoids rubbing on the magnetic coil assembly 50.

The finger 44 is relatively short compared with the finger 46 which is relatively long as shown in FIG. 4. The finger 44 is positioned on the face 36 on the radial portion 22 of the armature member 20 so that the finger cooperates with the second indentation 34 to form a first predetermined spring offset when the spring 40 is secured by a screw 38 to the hub 12 as shown in FIG. 2. The finger 46 is positioned on the face 36 so that the finger 46 acts against the first indentation 32 to form a second predetermined spring offset when the spring 40 is secured by the screw 38 to the hub 12. The finger 44 exerts a relatively large force on the armature member 20 sufficient to initially separate the armature from the magnetic coil assembly and to overcome residual magnetic forces. The finger 46 exerts a relatively smaller force on the armature to further separate the armature from the magnetic coil assembly after initial breakaway and to permit relative rotation of the clutch members.

Referring to FIG. 1, there is shown the magnetic coil assembly 50 having hub a 52 secured to the driven shaft 9 by a key 54 and a ring 56 with a set screw 58. The hub 52 has an inner pole 60 and an outer pole 62 of a magnetic material which is separated by a ring 64 of a non-magnetic material, such as aluminum. The outer pole 62 has teeth 66 near its circumference for engaging corresponding teeth 68 on the armature 20 when the clutch is engaged.

An electromagnet 70 has a circular core 72 of magnetic material having a substantially "U" shaped cross section and with a coil 74 thereon between the legs of the "U" shaped cross section. The coil is connected to an electrical lead 76 for energization by a power source (not shown). The electromagnet 70 is rotatably mounted on the hub 52 by a bearing 78 and thrust washers 80 at each end of the electromagnet. An end plate 82 is secured to the core 72. The hub 52 rotates relative to the electromagnet 70 when the clutch is engaged to avoid the use of slip rings for providing power to the electromagnet.

When the electromagnet is energized, magnetic flux passes from the outer leg of the core 72 to the outer pole 62 through the armature member 20 to the inner pole 60 and then to the inner leg of the core 72.

OPERATION

To engage the clutch, the electromagnet 70 is energized and the magnetic force moves the armature member 20 axially on the hub 12 along the splines 16 and 26 toward the inner and outer poles 60 and 62 to engage the teeth 68 on the armature with the teeth 66 on the outer pole. This provides a driving connection between the armature and the poles. To disengage the clutch, the electromagnet 70 is deenergized and the spring 40 moves the armature member 20 axially on the hub 12 to disengage the teeth 66 and 68, and thereby permits relative rotation of the armature assembly 10 and the magnetic coil assembly 50. The finger 44 resting on the second identation 34 on the armature member 20 provides a sufficient offset so that a relatively large spring force acts for initial breakaway of the armature member 20 from the poles 60 and 62 to overcome residual magnetism and metal to metal contact of the teeth 66, 68. After initial breakaway, the finger 44 loses contact with the armature member 20 and the finger 46, resting on the first indentation 32 and generating a relatively smaller spring force, moves the armature axially relative to the hub 12 a sufficient distance to completely disengage the teeth 66, 68 and to permit relative rotation of the clutch members.

With this arrangement, the magnetic force required for engaging the teeth 66 and 68 need overcome only the relatively small spring force of the finger 46 during the greater part of the movement of the armature member 20 towards the magnetic poles 60 and 62 and the relatively large spring force of the finger 44 need to overcome only during final engagement of the teeth 66 and 68 when the air gap between the poles and the armature member is small. The spring may be formed from a steel wire or other suitable spring material and is inexpensive to manufacture.

What I claim is:

1. An electromagnetic clutch comprising:
   a driven clutch member;
   a driving clutch member mounted adjacent to said driven clutch member for communication with said driven clutch member;
   electromagnetic actuating means mounted to said driven and driving clutch members for providing a driving engagement between said driven and driving clutch members when the electromagnet actuating means is energized, said electromagnet actuating means further comprising:
   an electromagnetic armature member; a hub member mounted adjacent to said electromagnetic armature for communication therewith and a spline connecting said electromagnetic armature to said hub member for providing relative movement between said hub member and said electromagnetic armature, said electromagnetic armature further comprising:
   a face portion;
   a first indentation in said face portion; and
   a second indentation in said face portion adjacent said first indentation;
   a pair of magnetic poles mounted adjacent said electromagnetic armature member for drivably engaging said armature member;
   mutually engagable driving teeth mounted to said armature member and one of said pair of magnetic poles for engagement of said armature member to said one of said pair of magnetic poles when said electromagnet actuating means is energized; and
   biasing means, mounted between said driven and driving clutch members for disconnecting said driving engagement of said electromagnet actuating means when said electromagnet actuating means is deenergized, said biasing means further cooperating with said first indentation to provide an initial breakaway force to separate said armature member from said pair of magnetic poles and cooperating with said second indentation to provide a smaller force than said initial breakaway force to further separate said armature member from said pair of magnetic poles.

2. The clutch as claimed in claim 1 wherein said biasing means further comprises:
   first biasing means for providing a force sufficient to overcome residual magnetism to permit initial breakaway of said driven and driving clutch members;

second biasing means for providing said smaller force; and means for attaching said first and second biasing means to said hub member so that said first and second biasing means engage said electromagnetic armature.

3. The clutch as claimed in claim 2 wherein said first biasing means further comprises a short spring finger which pushes on said first indentation of said electromagnetic armature; and wherein said second biasing means comprises a long spring finger which pushes on said second indentation on said electromagnetic armature.

4. An electromagnetic clutch comprising:

a driven clutch member;

a driving clutch member mounted adjacent said driven clutch member; and electromagnetic actuating means, mounted to said driven and driving clutch members, for providing a driving engagement between said driven and driving clutch members when said electromagnetic actuating means is energized, said electromagnetic actuating means further including:

armature means having portions defining a first indentation and a second indentation adjacent said first indentation;

a pair of magnetic poles mounted adjacent said armature means for drivably engaging said armature means;

mutually engageable teeth mounted to said armature means and one of said pair of magnetic poles for engagement of said armature means to said one of said pair of magnetic poles when said electromagnetic actuating means is energized; and biasing means, mounted between said driven and driving clutch members, for cooperating with said first indentation to provide an initial breakaway force to separate said armature means from said pair of magnetic poles and for cooperating with said second indentation to provide a smaller force than said initial breakaway force to further separate said armature means from said pair of magnetic poles to permit relative rotation of said driven and driving clutch members when said electromagnetic actuating means is de-energized.

5. The electromagnetic clutch as claimed in claim 4 wherein said biasing means further comprises:

first biasing means, cooperating with said first indentation, for forming a first predetermined offset to provide said initial breakaway force; and second biasing means, cooperating with said second indentation, for forming a second predetermined offset to provide said smaller force.

6. The electromagnetic clutch as claimed in claim 5 wherein said first biasing means includes a first finger and wherein said second biasing means includes a second finger.

7. The electromagnetic clutch as claimed in claim 6 wherein said first finger is longer than said second finger.

8. An electromagnetic clutch comprising:

driven means;

driving means mounted adjacent to said driven means; and electromagnetic actuating means, mounted to said driven and driving means, for providing a driving engagement between said driven and driving means when said electromagnetic actuating means is energized, said electromagnetic actuating means further including:

armature means having a hub member, an electromagnetic armature mounted adjacent to said hub member for communication therewith and a spline connecting said electromagnetic armature to said hub member for providing relative movement between said hub member and said electromagnetic armature, said electromagnetic armature further comprising:

a face portion;

a first indentation in said face portion;

a second indentation in said face portion adjacent said first indentation;

a pair of magnetic poles mounted adjacent said armature means for drivably engaging said armature means;

mutually engagable teeth mounted to said armature means and one of said pair of magnetic poles for engagement of said armature means to said one of said pair of magnetic poles when said electromagnetic actuating means is energized; and biasing means, mounted between said driven and driving means, for disengaging said driven means from said driving means when said electromagnetic actuating means is de-energized, said biasing means further including:

first biasing means, engaging said first indentation, for providing a first force sufficient to overcome residual magnetism for initial breakaway of said driven means from said driving means; and second biasing means, engaging said second indentation, for providing a second force smaller than said first force to further separate said electromagnetic armature means from said pair of magnetic poles so that said first force is effective only during initial breakaway of said armature means from said pair of magnetic poles and said second force is thereafter effective.

9. An electromagnetic clutch as claimed in claim 8 wherein said biasing means further includes:

means for attaching said first and second biasing means to said hub member such that said first biasing means cooperatively engages said first indentation and said second biasing means cooperatively engages said second indentation to urge said armature means away from said pair of magnetic poles.

* * * * *

UNITED STATES PATENT AND TRADEMARK OFFICE
CERTIFICATE OF CORRECTION

PATENT NO. : 4,353,450
DATED : October 12, 1982
INVENTOR(S) : Jack C. Wakefield

It is certified that error appears in the above-identified patent and that said Letters Patent is hereby corrected as shown below:

Column 3, line 17, delete "large" and insert --- larger ---.

Column 3, line 25, delete "hub a" and insert --- a hub ---.

Signed and Sealed this

Thirtieth Day of August 1983

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,353,450

DATED : October 12, 1982

INVENTOR(S) : Jack C. Wakefield

It is certified that error appears in the above-identified patent and that said Letters Patent is hereby corrected as shown below:

Column 3, line 17, "finger 44" should read -- finger 46 --.

Column 3, line 20, "finger 46" should read -- finger 44 --.

Signed and Sealed this

Thirteenth Day of March 1984

[SEAL]

Attest:

GERALD J. MOSSINGHOFF

Attesting Officer

Commissioner of Patents and Trademarks